(No Model.)

H. S. PEASE.
SAD IRON.

No. 324,585. Patented Aug. 18, 1885.

WITNESSES:
Theo. G. Hoster
C. Sedgwick

INVENTOR:
H. S. Pease
BY Munn & Co
ATTORNEYS.

UNITED STATES PATENT OFFICE.

HORACE S. PEASE, OF PORTAGE, WISCONSIN.

SAD-IRON.

SPECIFICATION forming part of Letters Patent No. 324,585, dated August 18, 1885.

Application filed December 19, 1884. (No model.)

*To all whom it may concern:*

Be it known that I, HORACE S. PEASE, of Portage, in the county of Columbia and State of Wisconsin, have invented a new and Improved Smoothing-Iron, of which the following is a full, clear, and exact specification.

The object of my invention is to provide a new and improved smoothing-iron which can be used for polishing, fluting, and pressing, and can easily be adjusted for either purpose.

The invention consists of a smoothing-iron having a curved fluter secured to its handle, as hereinafter fully described.

Reference is to be had to the accompanying drawings, forming a part of this specification, in which similar letters of reference indicate corresponding parts in both the figures.

Figure 1:
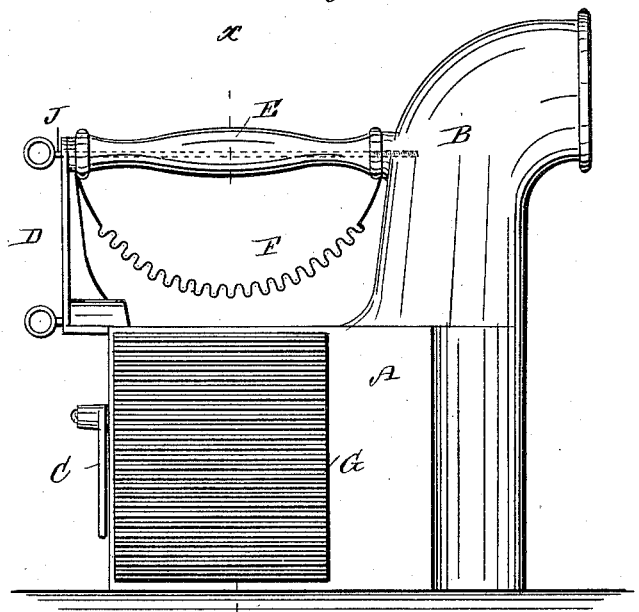
Figure 2:
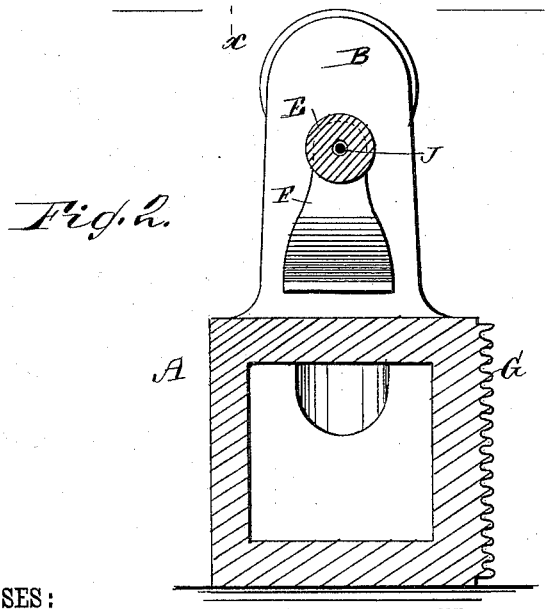

Figure 1 is a side view of my improved smoothing-iron. Fig. 2 is a cross-sectional view of the same on the line $x\ x$, Fig. 1.

The smoothing-iron A is made hollow and provided at one end with an upwardly-projecting curved neck or flue, B, and at the opposite end with draft gate C. A standard, D, is provided at the rear end of the box, and between the same and the neck B a handle, E, is held by a pin, J, passed through the upper end of the standard D, longitudinally through the handle, and into the neck B, the inner end of the said pin being preferably screw-threaded and the outer end provided with an eye or handle. A curved fluting-iron, F, is secured on the under side of the handle, and is located between the top of the box and the handle. A flat fluting-plate, G, is formed on the side of the box.

The iron is heated by means of charcoal placed in it, and the draft is regulated by means of the gate C.

To use the fluter the iron A is placed on a support with the fluted surface to the top, and the article to be fluted is placed on the flutings G, and the curved fluter F is placed on the article and rocked on it. The fluted surface of the iron is heated, and thus by rocking the fluter F the article is fluted.

The handle and the fluter can easily be attached or detached, as may be necessary.

Having thus described my invention, I claim as new and desire to secure by Letters Patent—

1. A smoothing-iron provided with a handle and a curved fluter secured to the handle, substantially as herein shown and described.

2. The combination, with the smoothing-iron A, having the neck B and the standard D, of the handle E, and the curved fluter F, secured on the under side of the handle, substantially as herein shown and described.

3. The combination, with the smoothing-iron A, having flutings G on one side, of the handle E, and the curved fluter F on the handle, substantially as herein shown and described.

HORACE S. PEASE.

Witnesses:
- JOHN BIESNER,
- GEORGE LOADER.